(12) United States Patent
Wyatt et al.

(10) Patent No.: US 8,823,725 B1
(45) Date of Patent: Sep. 2, 2014

(54) SYSTEM, METHOD, AND COMPUTER PROGRAM PRODUCT FOR DETERMINING A DUTY CYCLE FOR A PIXEL

(75) Inventors: David Wyatt, San Jose, CA (US);
Daniel William Nolan, Austin, TX (US);
Michael A. Ogrinc, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1268 days.

(21) Appl. No.: 12/337,555

(22) Filed: Dec. 17, 2008

(51) Int. Cl.
*G09G 5/02* (2006.01)
*G09G 3/36* (2006.01)
*G06F 3/038* (2013.01)
*G09G 5/00* (2006.01)

(52) U.S. Cl.
USPC ............... 345/589; 345/96; 345/88; 345/209

(58) Field of Classification Search
CPC ............ H04N 9/3197; H04N 13/0422; H04N 9/3155; G09G 3/2025; G09G 3/2051; G09G 3/3611; G09G 3/3607; G09G 3/2003
USPC ...................... 345/589, 96, 88, 209
See application file for complete search history.

(56) References Cited

U.S. PATENT DOCUMENTS

| | | | |
|---|---|---|---|
| 5,175,807 A | 12/1992 | Cawley et al. | |
| 5,404,427 A * | 4/1995 | Cawley et al. | ............... 345/597 |
| 6,281,938 B1 | 8/2001 | Rogers | |
| 2006/0291558 A1 * | 12/2006 | Schreier et al. | .......... 375/240.13 |
| 2008/0100598 A1 * | 5/2008 | Juenger | ......................... 345/204 |
| 2009/0066620 A1 * | 3/2009 | Russell et al. | .................. 345/88 |
| 2010/0066757 A1 * | 3/2010 | Kondo et al. | ................. 345/599 |

FOREIGN PATENT DOCUMENTS

EP     0270259 A2    6/1988

OTHER PUBLICATIONS

Yasuoka, Image Signal Processor, Nov. 9, 2008. Japanese Patent Translation.*
U.S. Appl. No. 11/957,374 dated Dec. 14, 2007.
U.S. Appl. No. 11/957,375 dated Dec. 14, 2007.

* cited by examiner

*Primary Examiner* — Xiao Wu
*Assistant Examiner* — Wynton S Jones
(74) *Attorney, Agent, or Firm* — Zilka-Kotab, PC

(57) ABSTRACT

A system, method, and computer program product are provided for determining a duty cycle for a pixel (e.g. of alternating pixel values to achieve an average pixel color). In use, a first value of a sub-color component bit of a pixel is determined. Additionally, a second value for the sub-color component bit of the pixel is calculated. Further, a duty cycle for alternating between the first value and the second value is determined (e.g. which when applied at normal display frame rate may achieve an average color).

14 Claims, 9 Drawing Sheets

FIGURE 7

SYSTEM, METHOD, AND COMPUTER PROGRAM PRODUCT FOR DETERMINING A DUTY CYCLE FOR A PIXEL

FIELD OF THE INVENTION

The present invention relates to displays, and more particularly to duty cycles of displays.

BACKGROUND

Traditionally, displays have been limited in the quality of color they are capable of outputting. Unfortunately, the quality of color for a display has been a direct result of a number of bits per color component provided by the display. For example, displays with a higher bit per color component precision (e.g. 10 bit per color component) generally have higher quality color than displays with a lower number of bits per color component (e.g. 8 bit per color component).

Techniques have been utilized for modifying intensity levels for the displays. However, such techniques have been insufficient in providing a quality of color greater than that otherwise allowed by a display due to the use of repeating patterns, etc. There is thus a need for addressing these and/or other issues associated with the prior art.

SUMMARY

A system, method, and computer program product are provided for determining a duty cycle for a pixel. In use, a first value of a sub-color component bit of a pixel is determined. Additionally, a second value for the sub-color component bit of the pixel is calculated. Further, a duty cycle for alternating between the first value and the second value is determined.

BRIEF DESCRIPTION OF THE DRAWINGS

FIG. 7 shows neighboring pixels with different duty cycles, in accordance with still yet another embodiment.

DETAILED DESCRIPTION

Figure 1:
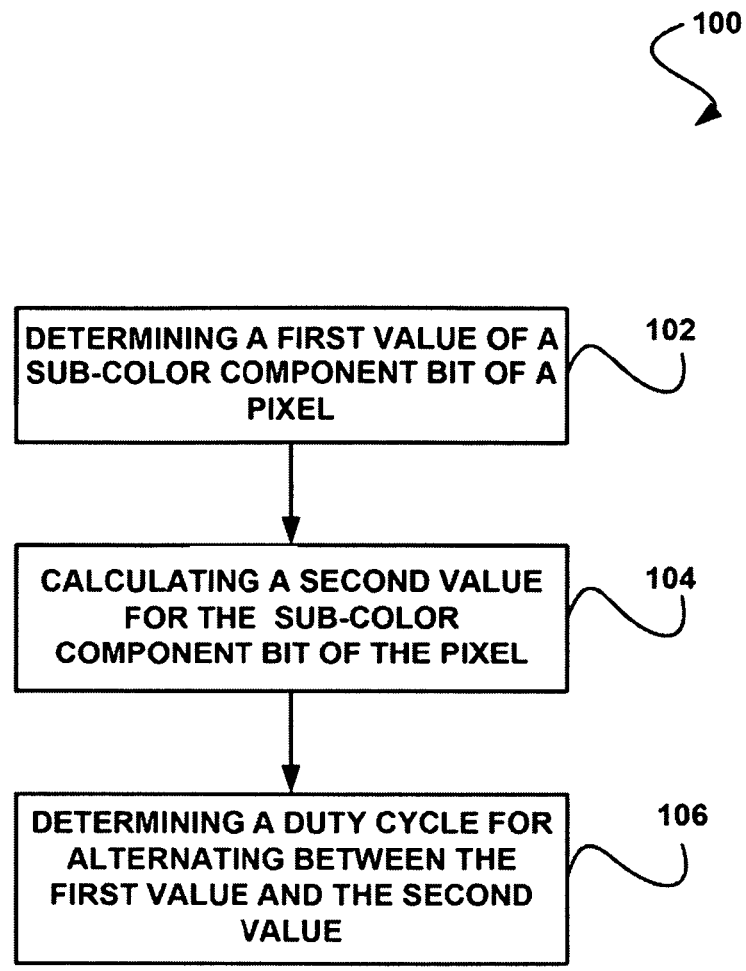
FIG. 1 shows a method for determining a duty cycle for a pixel, in accordance with one embodiment.

FIG. 1 shows a method 100 for determining a duty cycle for a pixel, in accordance with one embodiment. As shown in operation 102, a first value of a sub-color component bit of a pixel is determined. In the context of the present description, the pixel may include a pixel of at least one frame of any digital image. For example, the pixel may include a larger data element containing color-sub-components (e.g. a 32 bit pixel may contains 8 bits of alpha or unused, including 8 bits of red, 8 bits of green, and 8 bits of blue or 2 bits of alpha or unused, followed by 10 bits of red, 10 bits of green, and 10 bits of blue). The red, green and blue sub-components may be fed separately into color primaries of a display.

In one embodiment, the sub-color component bit may include a least significant sub-color component bit of the pixel. Such least significant sub-color component bit of the pixel may optionally include a sub-color component bit unsupported by (e.g. incapable of being displayed by) a display to be utilized for displaying the pixel. For example, the least significant sub-color component bit of the pixel may include an eighth sub-color component bit of the pixel, whereas the display may only support six bits per component. Of course, however, the sub-color component bit may include any sub-color component bit of the pixel.

It should be noted that the display may include any device capable of displaying pixels. In various embodiments, the display may include a liquid crystal display (LCD), a cathode ray tube (CRT), etc. As an option, the display may include a digital display interface, such as a low-voltage differential signaling display, a transition minimized differential signaling (TMDS) display, a DisplayPort™ display, etc.

In another embodiment, the first value may include a value of the sub-color component bit of the pixel that is stored in a frame buffer. Thus, the first value may be determined by reading the first value from the frame buffer. In yet another embodiment, the first value may be a value of a color component of the pixel. Just by way of example, the first value may be a value for a red, green or blue color component of the pixel.

Additionally, as shown in operation 104, a second value for the sub-color component bit of the pixel is calculated. The second value may be a value of a color component of the pixel. Just by way of example, the first value may be a value for a red, green or blue color component of the pixel. In one embodiment, the second value may include a value different from the first value. Accordingly, the first value and the second value may be for the same color component of the pixel.

It should be noted that the second value for the sub-color component bit of the pixel may be calculated in any desired manner. For example, in one embodiment, the second value may be calculated by incrementing the first value by a constant. As an option, the constant may be '1', such that the second value may equal the first value plus '1'.

Furthermore, a duty cycle for alternating between the first value and the second value is determined, as shown in operation 106. The duty cycle may indicate the time in which each of the first value and the second value are alternately displayed. Thus, the duty cycle may include a duty cycle for the display via which the pixel is displayed.

In one embodiment, the duty cycle may be determined by determining an average value. The first value and the second value may optionally be determined from the average value (e.g. may an equal delta from the average value, may be a distance from the average value proportional to a duty cycle period of the values, etc.). Such first value and second value may optionally be determined from the average value utilizing a look-up table [e.g. a temporal pattern table of pixel adjustments (TPPT), etc.]. Moreover, the duty cycle may be determined based on the average. In one embodiment, the duty cycle may be determined based on the average value and a ratio of the first value and the second value necessary to create the average value.

Just by way of example, the duty cycle may provide an apparent display of the average value to a viewer when alternating between the first value and the second value. Thus, the duty cycle may be determined for the particular purpose of resulting in an apparent display of the average value to a viewer when alternating between the first value and the second value.

In another embodiment, the duty cycle may be determined by calculating a third value between a maximum color range of the display to be utilized for displaying the pixel (e.g. 0 to 255, etc.). Further, the third value may be calculated by multiplying a maximum color value of the display by a number between '0' and '1'. Such number between '0' and '1' may be random, as an option.

Still yet, the duty cycle may be determined by determining a remainder of the third value. Thus, the remainder of the third value may optionally indicate the duty cycle. Just by way of example, if the remainder is 0.33, then the second value may be displayed ⅔ of the time and the first value may be displayed ⅓ of the time, for resulting in an apparent display of the average value of the sub-color component bit of the pixel.

As an option, alternating between the first value and the second value based on the duty cycle may provide temporal dithering. As another option, the determination of the duty cycle (operation 106) may be performed by a backend of a graphics controller. As yet another option, the determination of the duty cycle (operation 106) may be performed implemented in a test applet In this way, the sub-color components of the pixel may be oscillated between different values, on a per sub-color component basis, and any adjustments or look-up tables can be arranged on a per sub-color component basis.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
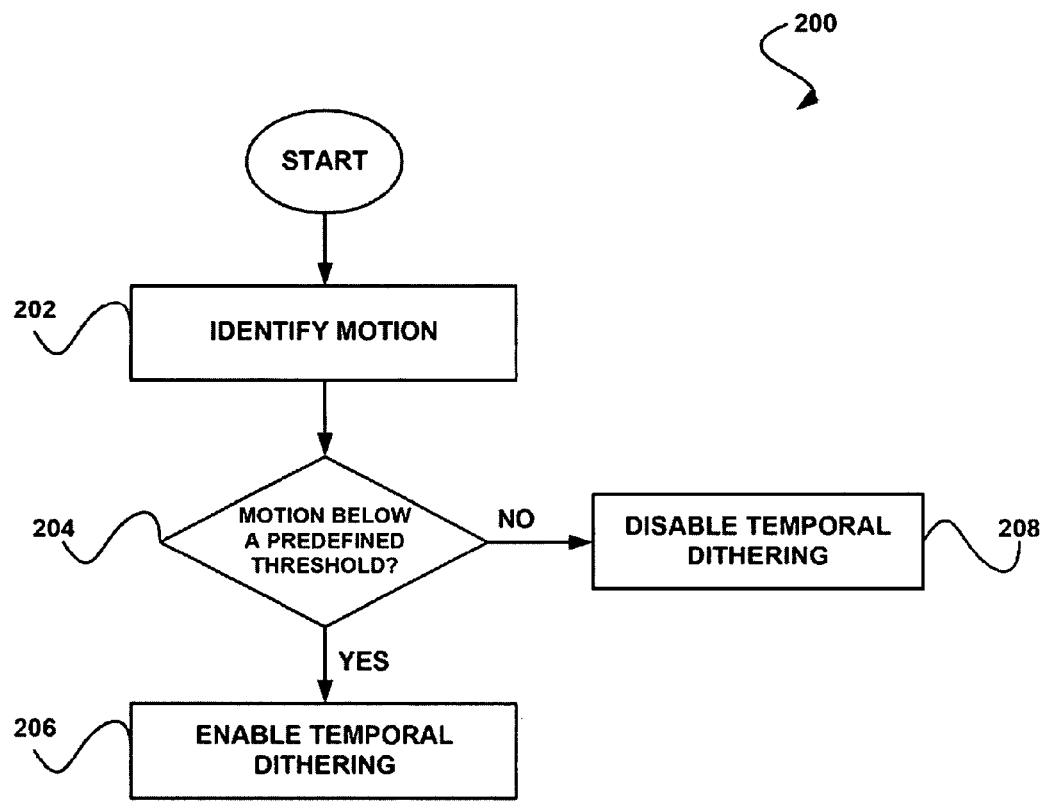
FIG. 2 shows a method for enabling temporal dithering, in accordance with another embodiment.

FIG. 2 shows a method 200 for enabling temporal dithering, in accordance with another embodiment. As an option, the method 200 may be carried out in the context of FIG. 1. Of course, however, the method 200 may be carried out in any desired context. It should also be noted that the aforementioned definitions may apply during the present description.

As shown in operation 202, a motion is identified. In the context of the present embodiment, the motion may include movement associated with a digital image over a period of time. For example, the motion may include changing pixels over multiple frames of an image. Thus, an extent to which the digital image includes motion may be identified. Various optional techniques that may be utilized for identifying the motion are described in more detail with respect to U.S. patent application Ser. No. 11/957,374, filed Dec. 14, 2007, and U.S. patent application Ser. No. 11/957,375, filed Dec. 14, 2007, which are hereby incorporated by reference.

Additionally, it is determined whether the motion is below a predefined threshold, as shown in decision 204. In one embodiment, the predefined threshold may include a threshold of movement predetermined to be the smallest amount of motion in a digital image which results in visual artifacts during averaging of values of bits of pixel components of the digital image. Just by way of example, the predefined threshold may be 0.5 frames per second. Of course, however, the predefined threshold may include any desired threshold that is predetermined.

If it is determined that the motion is below the predefined threshold, temporal dithering is enabled. Note operation 206. In the context of the present embodiment, the temporal dithering may include a determination of a duty cycle for alternating between a first value of a sub-color component bit of a pixel and a second value of the sub-color component bit of the pixel (e.g. as described in FIG. 1). For example, the temporal dithering may include an averaging of values of sub-color component bits of pixel components of the digital image.

If, however, it is determined that the motion is not below the predefined threshold, temporal dithering may be disabled. Note operation 208. In this way, high-color fidelity averaged over an interval may only be provided for images that are determined to be sufficiently static (e.g. images with less than the predetermined threshold of motion, images where the rate of inter-frame differences in a sequence of images is below a predefined threshold, etc. such as static images), including, for example, web pages, word processing documents, etc. For example, if the pixel colors of the image are rapidly changing and/or the full interval is not available, then the averaging process provided by the temporal dithering may be abandoned in order to avoid visual artifacts.

Figure 3:
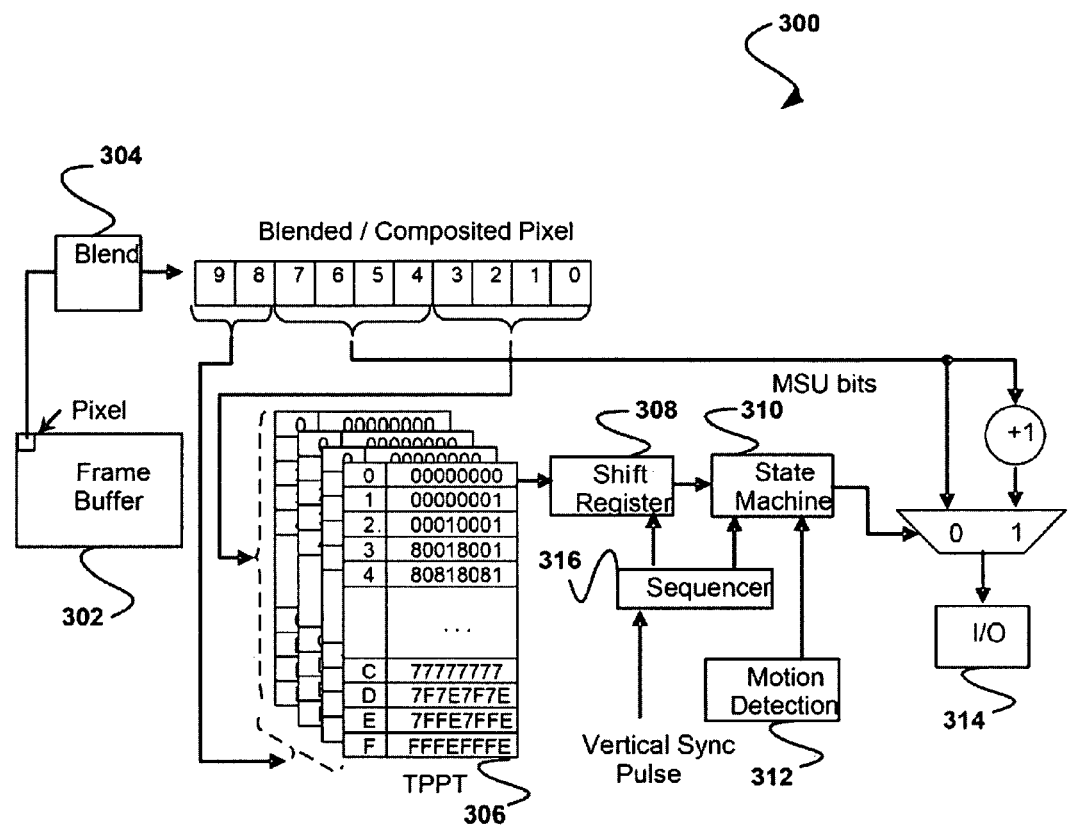
FIG. 3 shows a system for determining a duty cycle for a display, in accordance with yet another embodiment.

FIG. 3 shows a system 300 for determining a duty cycle for a display, in accordance with yet another embodiment. As an option, the system 300 may be implemented in the context of the functionality and architecture of FIGS. 1-2. Of course, however, the system 300 may be implemented in any desired environment. Again, it should be noted that the aforementioned definitions may apply during the present description.

As shown, a frame-buffer 302 contains at least one pixel. With respect to the present example, the pixel is a 10 bit per color pixel. Of course, it should be noted that the pixel may include any number of bits per color.

A blending module 304 blends the pixel and, in turn, the pixel is split up into two portions. The first portion includes higher order sub-color component bits (e.g. most significant bits) which equal the precision of a display (not shown) to which the pixel is output. For example, if the display includes a 6 bit per color pixel precision, the first portion may include the first 6 bits of the color component of the pixel.

The second portion includes lower order sub-color component bits (e.g. least significant bits). The lower order sub-color component bits may include the sub-color component bits which are not supported by the display. Thus, in the context of the 6 bit per color pixel precision display described above, the second portion may include the last 4 bits of the sub-color component of the pixel.

The second portion is used to perform a look-up in a TPPT 306. In one embodiment, the TPPT 306 may include a single table utilized for each color component of the pixel. As an option, however, the TPPT 306 may be replicated for each color component of the pixel. For example, in one embodiment it may be assumed the R, G, B color response ramps for the display have identical or at least very similar color response curves, such that the TPPT 306 may be instantiated once may be re-used for all colors of the pixel. In another embodiment, the TPPT 306 may be replicated once per color component.

As shown, the TPPT 306 includes a 16 element 32 bit look-up table which contains a plurality of bit patterns (e.g. temporal dithering patterns) each indicating a selection of values for neighboring primaries. Further, the 16 elements represent the least significant bits of a color of the pixel being translated for output to the display. To this end, the TPPT 306 may be used to translate pixels at the display back end. Optionally, the TPPT 306 may be programmable, such that the patterns therein may be modified as desired.

It should be noted that the TPPT 306 may be used to translate 10, 9, 8 or 7 bit pixel per component into 6 bit per pixel outputs by simply dropping the least significant bit(s) of the look-up value. Alternatively by taking 8 bits per pixel and looking-up only the least significant two bits from the TPPT 306, a 10 bit per pixel color precision can be created from an 8 bit per pixel display.

Further, it may be assumed that the response characteristics are identical across the output range of the display such that the same TPPT 306 may be used across the colors in the range 0 to 255 or 0 to 1023. In other embodiments, the TPPT 306 may be altered depending on which range of the color ramp is being translated (e.g. the color ramp could be broken up into quadrants with different TPPTs 306 for lower color intensities than middle or upper color intensities).

Using the bit pattern for the TPPT 306 may allow almost any desired pattern of '1' and '0' to be used to create a desired average of two colors. For example, as the pixel is read, the second portion may be used to lookup a bit pattern in TPPT 306. The identified bit pattern may be clocked out once per frame, in one embodiment. For example, assuming 32 bits per element, a display refresh rate of 60 hertz (Hz) and a sequencer 316 clock rate of once per frame, approximately 2 complete shifts may be provided by the shift register 308 per second. Of course, however, the identified bit pattern may be clocked out at a speed based on a vertical sync pulse provided to the sequencer 316.

As shown, a motion detection module 312 may be utilized for determining whether the pixel read from the frame buffer 302 is associated with a plurality of frames including at least a predefined amount of motion. The motion detection module 312 may change the state machine 310 based on the determination. For example, if the motion detection module 312 determines that the pixel read from the frame buffer 302 is associated with a plurality of frames including at least a predefined amount of motion, the motion detection module 312 may set the state machine 310 to indicate a state in which the pixel may not be averaged (e.g. via temporal dithering). If, however, the motion detection module 312 determines that the pixel read from the frame buffer 302 is not associated with a plurality of frames including at least a predefined amount of motion, the motion detection module 312 may set the state machine 310 to indicate a state in which the pixel may be averaged.

Other optional embodiments may use varying length bit patterns in order to create exact multiples of the refresh rate (e.g. 30 bits for 60 Hz, 20 bits for 40 Hz, etc.). As the bit pattern is clocked out the binary level of the bit may be used to select between either '0', representative of the value of the most significant bit of the first portion (i.e. Most Significant Upper (MSU), as shown), or '1' for the value of the most significant bit of the first portion incremented by one (i.e. MSU+1, as shown).

As an option, the pattern in the TPPT 306 may be pre-computed to give the desired higher precision color by averaging the alternation of the two colors (MSU and MSU+1). Moreover, the I/O pixel serializer 314 may represents the final output stage (e.g. the output to the display). In various embodiments, the I/O pixel serializer 314 may be any digital-to-analog converter (DAC) output (e.g. for a CRT), a parallel display output (e.g. Mio™ dislpay), a serial display output (e.g. LVDS, TMDS, DisplayPort™, etc.), and/or any other display I/O block.

To this end, the color sensing cones in the center of vision which are more perceptive at resolving color differences, and less capable at sensing changes, than the motion sensitive rods that are more common outside the center may allow an approximation of a middle color using two neighboring colors, which are alternately presented to the viewer via the display (e.g. at low frequency, such as low as 2 Hz). Accordingly, a limited per-color precision display may be provided with higher quality color utilizing the approximation (e.g. a 6 bit per component display may be provided with the same color as an 8 bit per component display). For example, graphics processing units (GPUs) may enable the simulation of higher quality output (e.g. 10 bit output) on a lower quality display (e.g. an 8 bit per component display).

Figure 4:
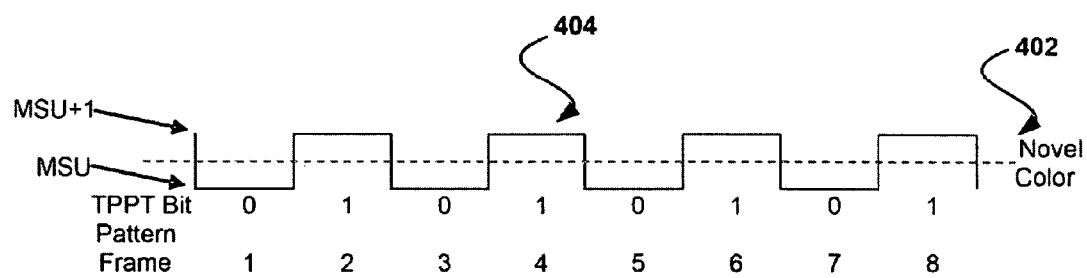
FIG. 4 shows a novel color resulting from a square wave, in accordance with still yet another embodiment.

FIG. 4 shows a novel color 402 resulting from a square wave 404, in accordance with still yet another embodiment. As an option, the novel color 402 may be determined in the context of the functionality and architecture of FIGS. 1-3. For example, the novel color 402 may include the average pixel color described above with respect to FIG. 3. Of course, however, the novel color 402 may be determined in any desired environment. It should also be noted that the aforementioned definitions may apply during the present description.

As shown, the response of a display to a square wave 404 with a given distribution of two colors (e.g. MSU & MSU+1) may result in a novel color 402 (e.g. averaged color, etc.) being the average of the ratio of two colors. For example, if the ratio of '1' and '0' in a TPPT is exactly 50/50 and the rate of oscillation is sufficiently fast, the resulting average color that is averaged by the psycho-visual effect of human perception may be exactly mid way between MSU and MSU+1, thus creating the novel color 402. Accordingly, the effective color precision may be increased by a factor of two without any change to the display.

The aforementioned averaging may be performed for other bit patterns. Just by way of example, assuming 25% duty cycle gives a color which is 25% of the way between MSU & MSU+1. Thus, if the following 4 duty cycle levels are used: 0% (a 0b000 bit pattern), 25% (a 0b0001 bit pattern), 50% (a 0b1010 bit pattern), 75% (a 0b1011 bit pattern) as well as 100% (a 0b1111 bit pattern), then three additional novel averaged colors may be introduced where previously only two were possible, increasing the color range by a factor of 4. However, it should be noted that the number of novel colors may not necessarily track the number of bits due to the number of bit patterns that produce equivalent averages (e.g. 010 may be the same as 100, and 001 in producing a 33% duty cycle and therefore the same average color.)

Figure 5:
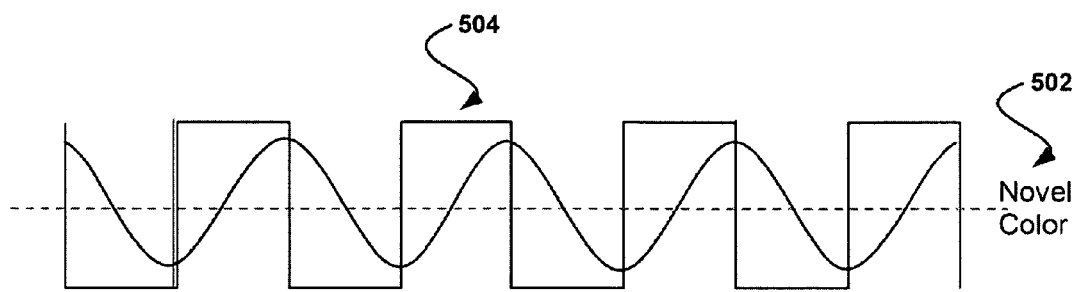
FIG. 5 shows a novel color resulting from a sine wave, in accordance with another embodiment.

FIG. 5 shows a novel color 502 resulting from a sine wave 504, in accordance with another embodiment. As an option, the novel color 502 may be determined in the context of the functionality and architecture of FIGS. 1-3. For example, the novel color 402 may include the average pixel color described above with respect to FIG. 3. Of course, however, the novel color 502 may be determined in any desired environment. It should also be noted that the aforementioned definitions may apply during the present description.

Due to the use of capacitive elements in modern thin-film transistor (TFT) LCD's based on an electrostatically tensioned liquid crystal element, such displays may have long latencies that roughly model a resistor-capacitor (RC) network, and thus may not necessarily result in a square wave response characteristic. Instead, such displays may have a sine wave 504 response characteristic. As an option, the color response and LCD response curves may be factored in determining the novel color 502.

As another option, the root mean square (RMS) equation may be used to compute the novel color 502. Just by way of example, the RMS of the duty cycle may be utilized to compute the novel color 502. To this end, the novel color 502 may be computed as the exact linear average between two points (e.g. the middle pixel is achieved with a 50% duty cycle).

In other various embodiments, color response curves may follow a gamma or sigmoidal curve. Thus, the novel color may be realized by using a color response curve of the display to set-up each quadrant. The upper sub-color component bits of the pixel may then be used to select the pattern in the TPPT to be used in providing the apparent averaged color.

Figure 6:
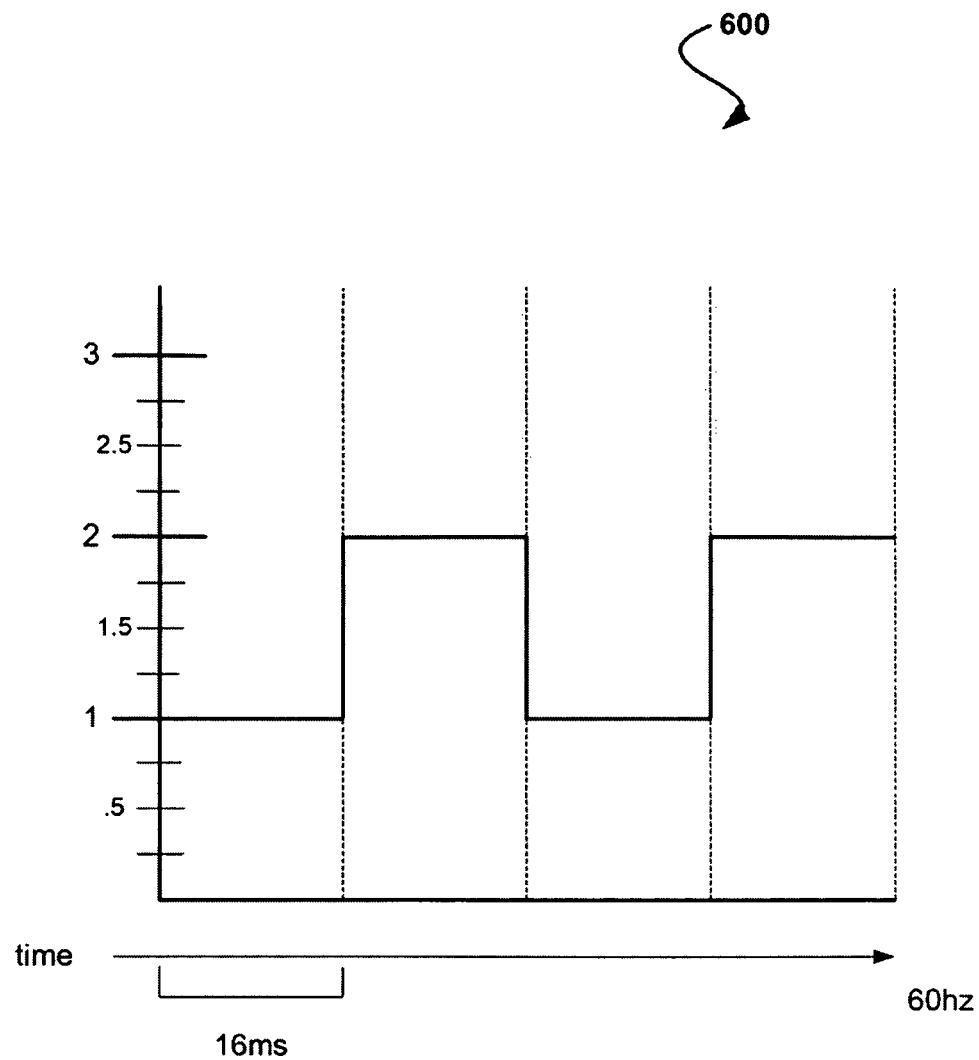
FIG. 6 shows an alternation between two patterns for a bit of a color component, in accordance with yet another embodiment.

FIG. 6 shows an alternation 600 between two patterns for a bit of a color component, in accordance with still yet another embodiment. As an option, the alternation 600 may be implemented in the context of the functionality and architecture of FIGS. 1-5. Of course, however, the alternation 600 may be implemented in any desired environment. Again, it should be noted that the aforementioned definitions may apply during the present description.

As shown, a least significant bit of a color component of a pixel is alternated between two color values '1' and '2'. Each color value may be associated with a different pattern in a TPPT, for example. Thus, the least significant sub-color component bit may be alternated between two different patterns.

In the context of the present embodiment, and just by way of example, the value of the least significant sub-color component bit may be '1'. To this end, the least significant sub-color component bit may be alternated between the value thereof (i.e. '1' in the present embodiment) and the value thereof incremented by one (i.e. 2 in the present embodiment).

The duty cycle for the least significant sub-color component bit may be determined based on the two color values. For example, a temporal pattern that results in an average (or RMS) providing an intermediate color value between the two color values '1' and '2' may be selected from the TPPT. With respect to the present embodiment, such temporal pattern may be '1.5'.

In one embodiment, '1.5' may be achieved by creating a 50% duty cycle for the least significant bit. For example, as shown, the refresh rate may be 60 Hz, such that every 16 milliseconds, the least significant sub-color component bit may be alternated between '1' and '2', thus resulting in an apparent display of the color value '1.5'.

Similarly, an average of any other least significant bits of each color component of the pixel may be determined based on the value of the sub-color component bit and the incremented value of the sub-color component bit. Once the average is identified, the duty cycle capable of providing an apparent display of such average may be determined.

Figure 7:
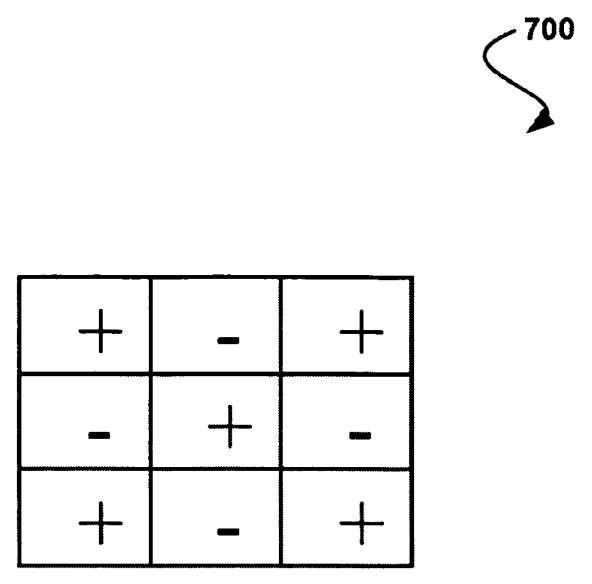

FIG. 7 shows neighboring pixels 700 with different duty cycles, in accordance with yet another embodiment. As an option, the neighboring pixels 700 may be implemented in the context of the functionality and architecture of FIGS. 1-6. Of course, however, the neighboring pixels 700 may be implemented in any desired environment. Again, it should be noted that the aforementioned definitions may apply during the present description.

To mitigate the possibility of flicker and/or other visual artifacts of a digital image due to whole frames flashing up and down via one or more pixels of every frame, the horizontal pixel and vertical line locations may optionally be used as counter inputs to clock out alternating temporal adjustment patterns. Accordingly, even pixels may be cycling up when the neighboring odd pixels are cycling down, as shown.

Just by way of example, in addition to a vertical sync pulse driving a shift register through which a pattern is sent, the shift value used may be alternated based on a position of the associate pixel and the vertical sync pulse. For a neighboring pixel, a different pattern (e.g. with minimal difference, etc.) may be utilized such that the neighboring pixels may each be alternated at different times.

As another option, a pseudo-random perturbation (e.g. using the lower pixel value into TPPT) may be performed on the pixels so that the desired duty cycle is still applied while preventing any dithering from interfering with visible content, and while preventing minimal introduction of visual artifacts to the visible content. For example, a random displacement for each of the pixels may be provided, such that neighboring pixels may alternate at different times.

Figure 8:
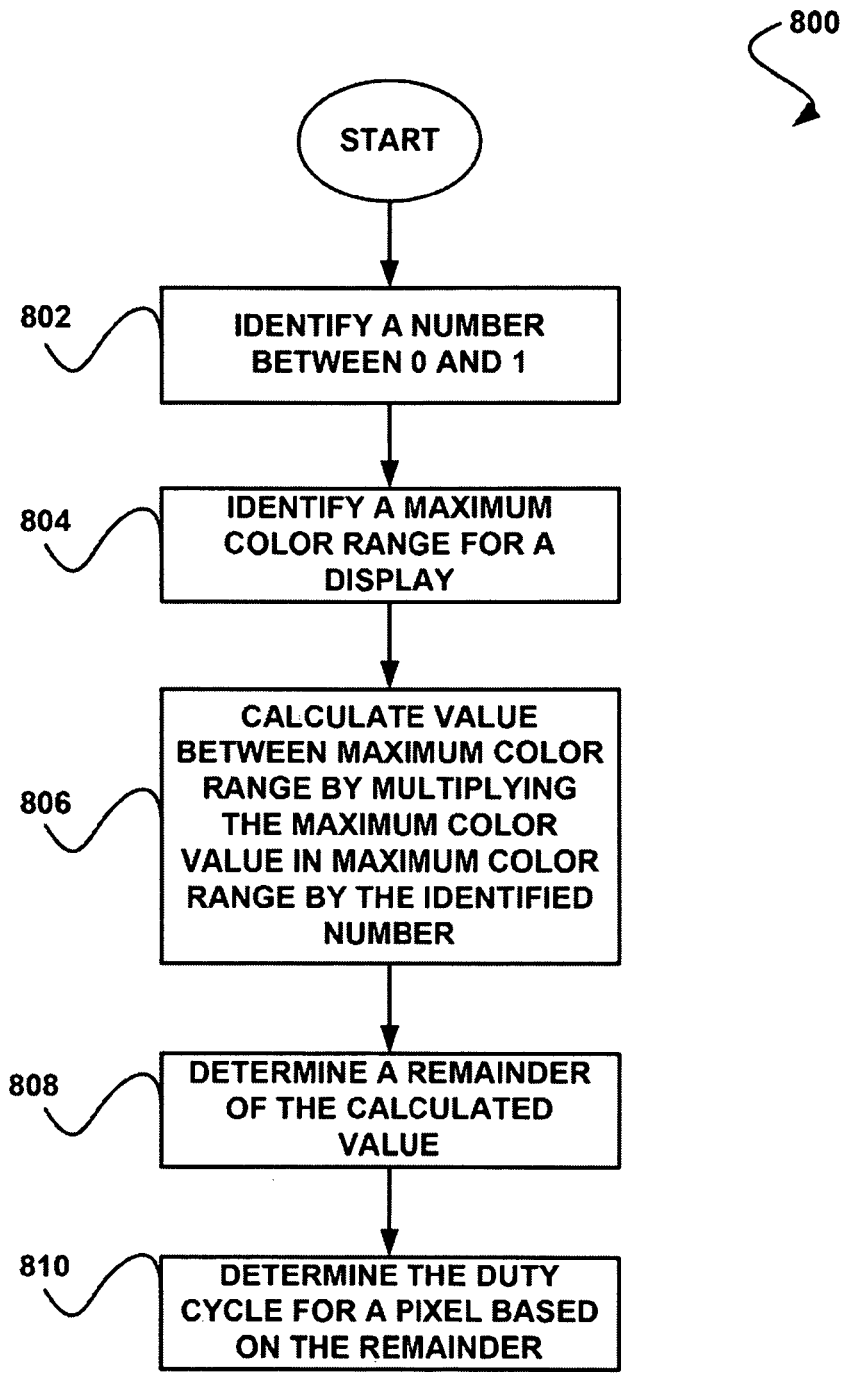
FIG. 8 shows a method for determining a duty cycle for a pixel based on a calculated remainder, in accordance with another embodiment.

FIG. 8 shows a method 800 for determining a duty cycle for a pixel based on a calculated remainder, in accordance with another embodiment. As an option, the method 800 may be carried out in the context of the functionality and architecture of FIGS. 1-7. Of course, however, the method 800 may be implemented in any desired environment. Yet again, it should be noted that the aforementioned definitions may apply during the present description.

As shown in operation 802, a number between '0' and '1' is identified. The number may be identified in any desired manner. For example, the number may be randomly generated. As another example, the number may include a value stored in a texture for a pixel. By utilizing a number between '0' and '1', a decimal may accordingly be identified.

Additionally, a maximum color range for a display is identified, as shown in operation 804. The maximum color range may include a range of colors capable of being output by the display. Thus, the maximum color range may include '0' to '255', etc.

Furthermore, a value between the maximum color range is calculated by multiplying the maximum color value in the maximum color range (e.g. '255' in the color range '0' to '255') by the number identified in operation 802. Since the number includes a decimal value, the calculated value may result in a remainder.

Still yet, the remainder of the calculated value is determined. Note operation 804. In turn, a duty cycle for a pixel may be determined based on the remainder, as shown in operation 810. In one embodiment, the remainder may indicate the duty cycle. For example, if the remainder includes '0.33', the duty cycle may alternate between two values of a bit of a color component of the pixel, where a first value is displayed ⅔ of the time and a second value is displayed ⅓ of the time.

Tables 1 and 2 shows examples of code for determining a remainder of the calculated value. Of course, it should be noted that such code is set forth for illustrative purposes only, and thus should note be construed as limiting in any manner.

Table 1

```
finalColor=tex2D(tex0, In);
    for (int i=0; i<3; ++i)
    {
    // sample is clamped [0, 1]
    color5Bit=finalColor [i]*maxColor; // max_int*[0,1]=[0, max]
    colorRemainder=modf(color5Bit, colorValue); // extract the remainder
    // the color remainder is the probability of the color being brightened
    if (colorRemainder>randomNumber)
    {
        if (colorValue<maxColor)
            colorValue++;
    }
    // convert back to clamped [0,1]
    finalColor [i]=colorValue/maxColor; // return the dithered value
```

}
   return finalColor;

Table 2

```
pTPPT=g_aTemporalPixelPatternTable_3 BitIndex;
// decode the color in the source pixel
   red=(cColor    &    (colorMask<<(sourceBitsPerSample<<1)))>>(sourceBitsPerSample<<1);
   redMod=pTPPT[(red & modMask)];
   red=red>>depthDiff;
   green=(cColor & (colorMask<<sourceBitsPerSample))>>sourceBitsPerSample;
   greenMod=pTPPT[(green & modMask)];
   green=green>>depthDiff;
   blue=cColor & colorMask;
   blueMod=pTPPT[(blue & modMask)];
   blue=blue>>depthDiff;
   if (g_bDither)
   {
   UINT16 rotation;
   if (ditherSeed<MAX_PRERENDERED_FRAMES)
      rotation=ditherSeed % (depthDiff<<2);
   else
      rotation=rand( ) % (depthDiff<<2);
   if ((redMod>>rotation) & 0x1)
      red=(red+g_nDitheringOverswing<maxColor) ? red+
         g_nDitheringOverswing:maxColor;
   if ((greenMod>>rotation) & 0x1)
      green=(green+g_nDitheringOverswing<maxColor)  ?
         green+g_nDitheringOverswing:maxColor;
   if ((blueMod>>rotation) & 0x1)
      blue=(blue+g_nDitheringOverswing<maxColor)    ?
         blue+g_nDitheringOverswing:maxColor;
   }
   wColor=(red<<(bitsPerColor<<1))|
(green<<bitsPerColor)|blue;
   return wColor;
```

Figure 9:
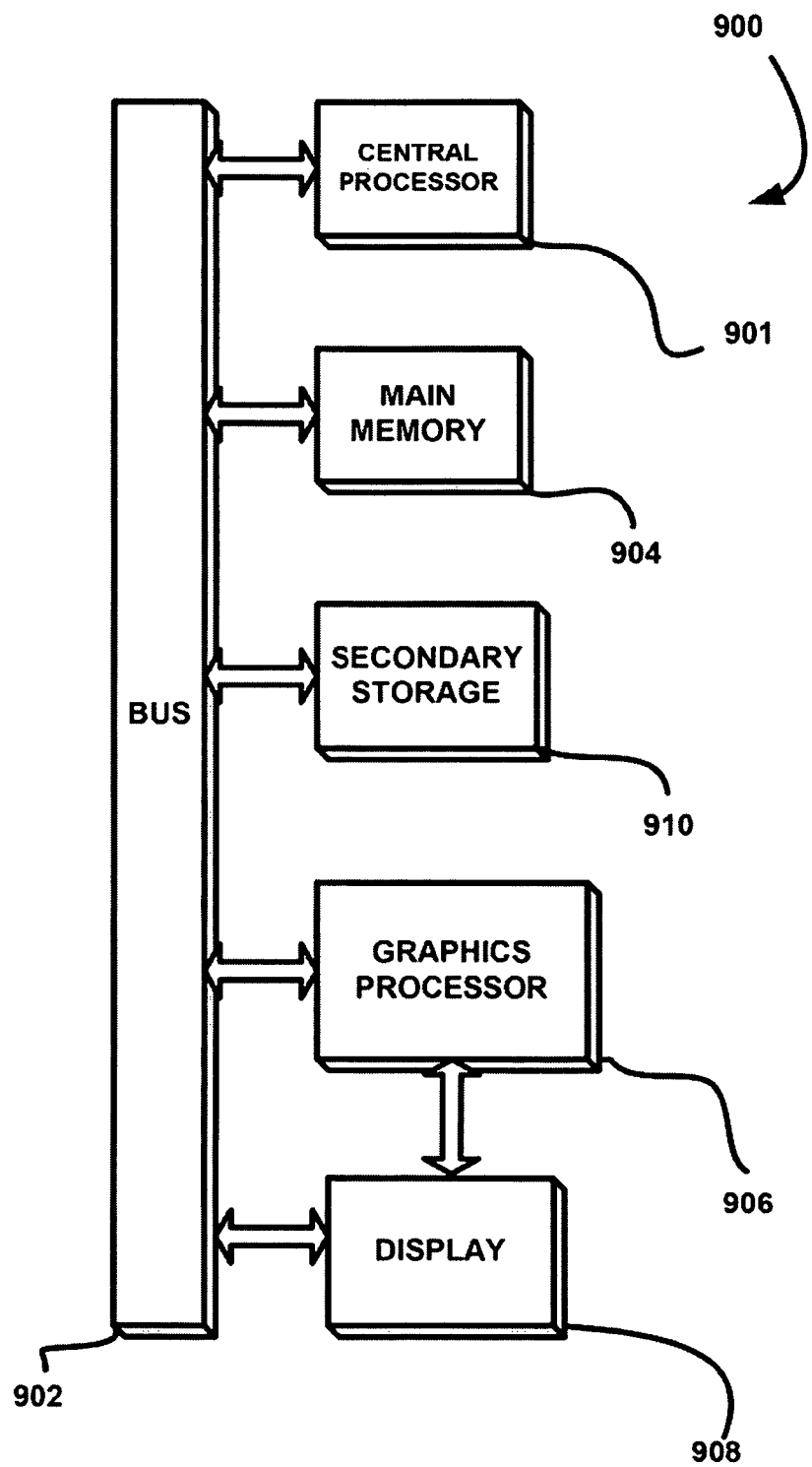
FIG. 9 illustrates an exemplary system in which the various architecture and/or functionality of the various previous embodiments may be implemented.

FIG. 9 illustrates an exemplary system 900 in which the various architecture and/or functionality of the various previous embodiments may be implemented. As shown, a system 900 is provided including at least one host processor 901 which is connected to a communication bus 902. The system 900 also includes a main memory 904. Control logic (software) and data are stored in the main memory 904 which may take the form of random access memory (RAM).

The system 900 also includes a graphics processor 906 and a display 908, i.e. a computer monitor. In one embodiment, the graphics processor 906 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 904 and/or the secondary storage 910. Such computer programs, when executed, enable the system 900 to perform various functions. Memory 904, storage 910 and/or any other storage are possible examples of computer-readable media.

In one embodiment, the architecture and/or functionality of the various previous figures may be implemented in the context of the host processor 901, graphics processor 906, an integrated circuit (not shown) that is capable of at least a portion of the capabilities of both the host processor 901 and the graphics processor 906, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, lap-top computer, and/or any other type of logic. Still yet, the system 900 may take the form of various other devices m including, but not limited to a personal digital assistant (PDA) device, a mobile phone device, a television, etc.

Further, while not shown, the system 900 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   determining a first value of a sub-color component of a pixel;
   calculating a second value for the sub-color component of the pixel; and
   determining a duty cycle for alternating between the first value and the second value transmitted to a display for the pixel,
   wherein the pixel includes a number of bits for each sub-color component split into a first portion and a second portion, and the precision of the display equals the number of bits in the first portion, and
   wherein the duty cycle comprises a bit pattern selected from a temporal pattern table of pixel adjustments based on bits in the second portion of the sub-color component of the pixel, and the bit pattern is applied to a shift register configured to shift the bit pattern based on a vertical sync pulse.

2. The method of claim 1, wherein the second portion includes a number of bits unsupported by the display.

3. The method of claim 1, wherein the duty cycle is determined in response to determining that a motion associated with a digital image including the pixel is below a predefined threshold, wherein the motion is calculated, at least in part, by comparing each pixel in the digital image to a corresponding pixel in another digital image.

4. The method of claim 3, wherein the duty cycle is determined only if the rate of inter-frame differences in a sequence of images is below a predefined threshold.

5. The method of claim 1, wherein the first value of the sub-color component of the pixel is read from a frame buffer.

6. The method of claim 1, wherein the second value of the sub-color component of the pixel is calculated by incrementing the first value of the sub-color component of the pixel by a constant.

7. The method of claim 1, further comprising determining the first value and the second value from an average value.

8. The method of claim 7, wherein the first value and the second value are an equal delta from the average value.

9. The method of claim 7, wherein the duty cycle is determined based on the average value and a ratio of the first value and the second value necessary to create the average value.

10. The method of claim 1, further comprising alternating between the first value and the second value based on the duty cycle for resulting in an apparent display of the average value to a viewer.

11. The method of claim 1, wherein the first value and the second value include different values of a sub-color component bit of the pixel.

12. A computer program product embodied on a non-transitory computer readable medium, comprising:
   computer code for determining a first value of a sub-color component of a pixel;
   computer code for calculating a second value for the sub-color component of the pixel; and
   computer code for determining a duty cycle for alternating between the first value and the second value transmitted to a display for the pixel,
   wherein the pixel includes a number of bits for each sub-color component split into a first portion and a second portion, and the precision of the display equals the number of bits in the first portion, and
   wherein the duty cycle comprises a bit pattern selected from a temporal pattern table of pixel adjustments based on bits in the second portion of the sub-color component of the pixel, and the bit pattern is applied to a shift register configured to shift the bit pattern based on a vertical sync pulse.

13. A system, comprising:
   a processor configured to:
      determine a first value of a sub-color component of a pixel,
      calculate a second value for the sub-color component of the pixel, and
      determine a duty cycle for alternating between the first value and the second value transmitted to a display for the pixel,
   wherein the pixel includes a number of bits for each sub-color component split into a first portion and a second portion, and the precision of the display equals the number of bits in the first portion, and
   wherein the duty cycle comprises a bit pattern selected from a temporal pattern table of pixel adjustments based on bits in the second portion of the sub-color component of the pixel, and the bit pattern is applied to a shift register configured to shift the bit pattern based on a vertical sync pulse.

14. The system of claim 13, wherein the processor remains in communication with memory and the display via a bus.

* * * * *